United States Patent
Pan et al.

(10) Patent No.: US 11,161,313 B2
(45) Date of Patent: Nov. 2, 2021

(54) TREAD SUPPORT DEVICE IN RETREAD FINISHING

(71) Applicant: Compagnie Generale des Etablissements Michelin, Clermont-Ferrand (FR)

(72) Inventors: Chinglin Pan, Mauldin, SC (US); Bruce Carney, Anderson, SC (US); Michael Chandler, Travelers Rest, SC (US); Michael Widmyer, Moore, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 540 days.

(21) Appl. No.: 16/087,798

(22) PCT Filed: Mar. 27, 2017

(86) PCT No.: PCT/US2017/024318
§ 371 (c)(1),
(2) Date: Sep. 24, 2018

(87) PCT Pub. No.: WO2017/172621
PCT Pub. Date: Oct. 5, 2017

(65) Prior Publication Data
US 2020/0298518 A1  Sep. 24, 2020

Related U.S. Application Data

(63) Continuation of application No. PCT/US2016/025178, filed on Mar. 31, 2016.

(51) Int. Cl.
*B29D 30/54* (2006.01)
*B29D 30/08* (2006.01)
(Continued)

(52) U.S. Cl.
CPC ............. *B29D 30/54* (2013.01); *B23Q 3/00* (2013.01); *B29D 30/08* (2013.01); *B29D 30/52* (2013.01); *B29D 2030/549* (2013.01)

(58) Field of Classification Search
CPC .. B24B 5/366; B24B 5/37; B24B 5/38; B24B 7/03; B24B 7/12; B24B 7/26;
(Continued)

(56) References Cited

U.S. PATENT DOCUMENTS 3,017,312 A   1/1962   Kraft
4,821,869 A   4/1989   Hodlewsky
(Continued)

FOREIGN PATENT DOCUMENTS

JP   H05116235         10/1991
JP   05116235  A  *  5/1993  ............. B29D 30/56
(Continued)

OTHER PUBLICATIONS

JP-2002086588 Machine Translation (Year: 2002).*
(Continued)

*Primary Examiner* — Orlando E Aviles
*Assistant Examiner* — Alberto Saenz
(74) *Attorney, Agent, or Firm* — Neal P. Pierotti

(57) ABSTRACT

A tread support device (10) for a retread process is provided that has a first support roller (12) that rotates about a first support roller axis. A second support roller (16) is present that rotates about a second support roller axis. A third support roller (20) is also included that rotates about a third support roller axis. The first support roller (10), the second support roller (12), and the third support roller (20) all
(Continued)

support a tread (24). Also in the tread support device (10), the first support roller axis, the second support roller axis, and the third support roller axis are arranged with respect to one another so as to be located on a circumference of a circle (32).

4 Claims, 9 Drawing Sheets

(51) Int. Cl.
    *B29D 30/52* (2006.01)
    *B23Q 3/00* (2006.01)

(58) Field of Classification Search
    CPC ...... B24B 21/025; B65G 15/60; B65G 15/62; B65G 15/64; B65G 13/12; B29D 30/08; B29D 30/52; B29D 30/54
    USPC ....... 451/131, 172, 182, 184, 188, 207, 260, 451/299, 300, 301, 364; 414/433; 198/782, 787, 837, 842; 193/35 R; 269/289 R
    See application file for complete search history.

(56) References Cited

U.S. PATENT DOCUMENTS

| 8,303,371 B2* | 11/2012 | Hetzel | B29D 30/52 |
| | | | 451/28 |
| 2007/0289847 A1* | 12/2007 | Nakamura | B65G 39/20 |
| | | | 198/617 |

FOREIGN PATENT DOCUMENTS

| JP | H05116235 A | | 5/1993 |
| JP | 2002086588 A | * | 3/2002 |
| JP | 2002086588 A | | 3/2002 |
| JP | 2013237231 A | | 11/2013 |

OTHER PUBLICATIONS

JP-05116235 Machine Translation (Year: 1993).*
European Patent Office; International Search Report and Written Opinion for patent application PCT/US2017/024318; dated Jun. 13, 2017; Publisher: European Patent Office, Rijswijk, Netherlands, pp. 1-11, enclosed.
European Patent Office; International Search Report and Written Opinion for patent application PCT/US2016/025178; dated Nov. 23, 2016; Publisher: European Patent Office, Rijswijk, Netherlands, pp. 1-11, enclosed.

* cited by examiner

TREAD SUPPORT DEVICE IN RETREAD FINISHING

CROSS-REFERENCE TO RELATED APPLICATIONS

The present application is a 35 U.S.C. § 371 application of PCT/US17/24318 filed on Mar. 27, 2017 and entitled "Tread Support Device in Retread Finishing." PCT/US17/24318 claims the benefit of PCT/US16/25178 filed on Mar. 31, 2016 and entitled "Tread Support Device in Retread Finishing." PCT/US17/24318 and PCT/US16/25178 are both incorporated by reference herein in their entireties for all purposes.

FIELD OF THE INVENTION

The present invention relates generally to a tread support device that is used in a retreading process. More particularly, the present application involves a tread support device that minimizes movement of the tread as the tread is brushed to result in improved finishing quality in a retreading process.

BACKGROUND

The retreading of tires involves the molding of a new section of tread that has a tread surface and an underside surface opposite from the tread surface. In order to attach the underside surface to the tire carcass that is being reused, the underside surface must be brushed to prepare the surface for attachment. The tread section is provided in the form of a longitudinal strip, and an end of the strip is held while the strip is fed into a brush machine. FIG. 1 shows the underside surface 26 of a tread 24 that is engaged by and is being treated by a brush 36. A roller 102 supports the tread 24 as the tread 24 is being brushed. A tread surface 28 of the tread 24 opposite the underside surface 26 engages the roller 102, and the tread 24 engages surfaces on the brush 36 and roller 102 that are both convex in shape. Tread 24 can have various patterns and in some instances may have large open tread blocks 54. Upon going through the nip created by the brush 36 and roller 102 in the machine direction 52, the leading edge 106 of the tread block 54 is brushed and the tread block 54 tilts upwards. As the tread block 54 moves past the brush 36, the trailing edge 108 of the tread block 54 is pinched by the brush 36 and the roller 102 and the tread block 54 tilts downward. As the tread block 54 is bending at irregular angles through the pinch point of the brush 36 and roller 102, an irregular contact patch is created on the tread block 54 under the brushing force.

The rigidity difference in the tread 24 between the tread blocks 54 and the grooves 104 of the tread 24 will cause the tread 24 to deform differently under the brushing force and feeding force of the tread 24 through the brush 36. This rigidity difference will also cause irregularities in the process due to the bending of the tread 24 along the roller 102 which may have a small radius and a convex surface onto which the tread 24 rests. Through the various factors, the large open block tread 24 will experience irregular movement when being fed past the brush 36 which will cause irregularity in the brushing of the tread 24.

With reference to FIG. 2, the underside surface 26 of the tread 24 is shown after being brushed by the brush 36. Due to the irregular movement via the factors discussed above, the leading edges 106 of the tread blocks 54 will have over brushed areas that can include dig in notches formed by the brush 36 on the underside surface 26. The trailing edges 108 of the tread blocks 54 will have various under brushed spots. These under brushed spots must be manually reworked, which is ergonomically unfriendly, and results in additional labor and costs. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Figure 1:
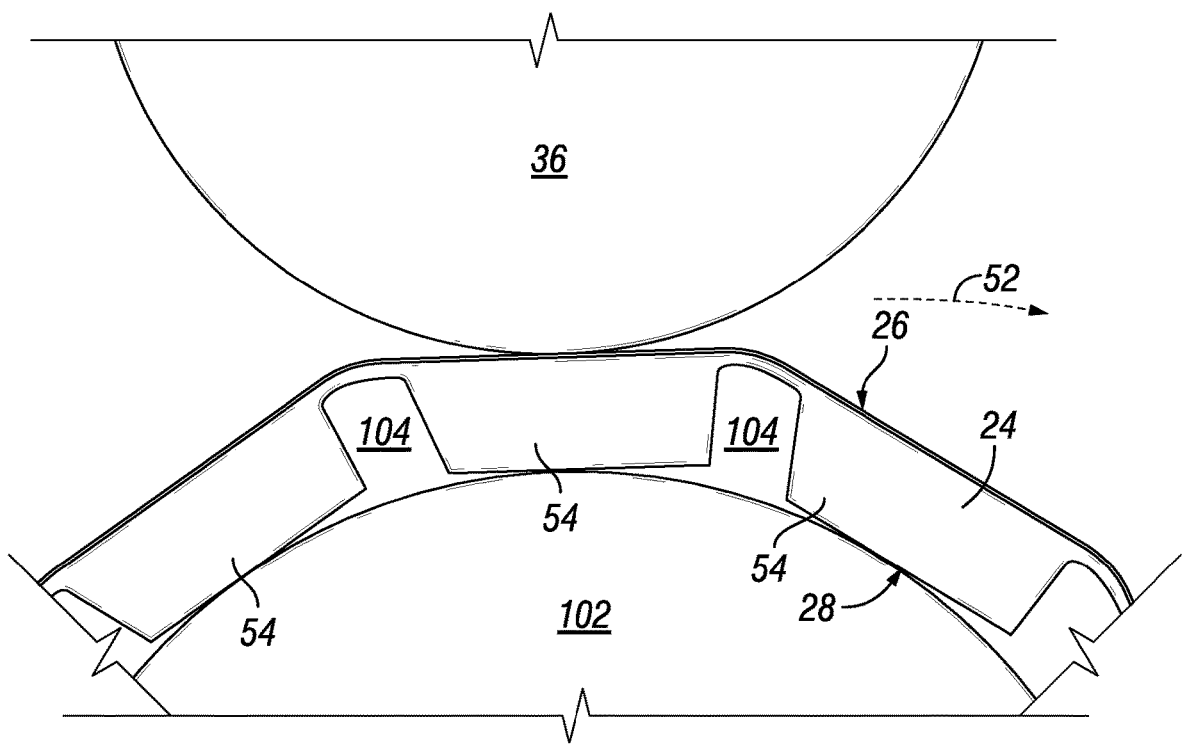
FIG. 1 is a side view of tread passing through a roller and brush in accordance with the prior art.
Figure 2:
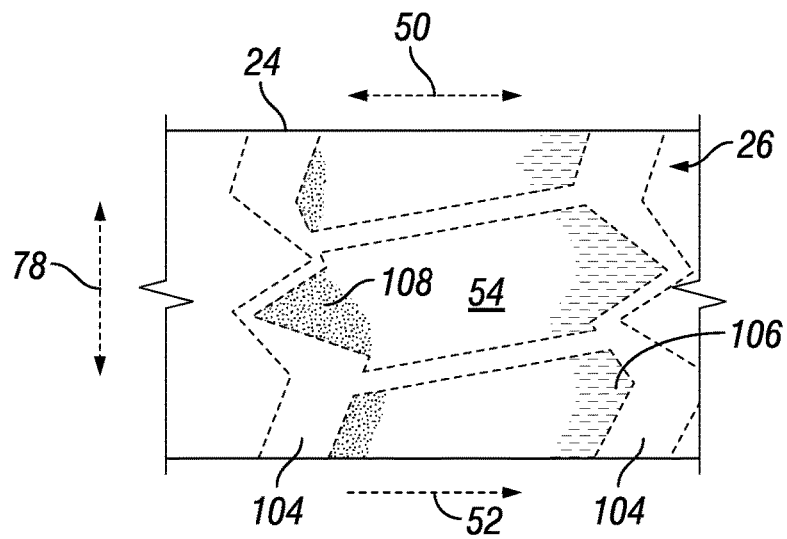
FIG. 2 is a top view of the underside surface of the tread that has passed through the brush and roller arrangement of FIG. 1.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a tread support device 10 that limits unwanted movement of the tread blocks 54 during the brushing operation to result in a more uniformly and desired brushing of the underside surface 26 of the tread 24. The problem of unwanted movement is especially seen with large, open tread blocks 54 and the tread support device 10 functions to contain or regulate this tread block 54 movement. The tread support device 10 acts to restrict space and provide a better support profile to the tread 24 as the tread 24 passes through the brushing area. The tread support device 10 features a plurality of rollers 12, 16 and 20 that are arranged on a circumference 30 of a circle 32. The arrangement results in better support of the tread 24 to eliminate unwanted movement and improve finishing.

Figure 3:
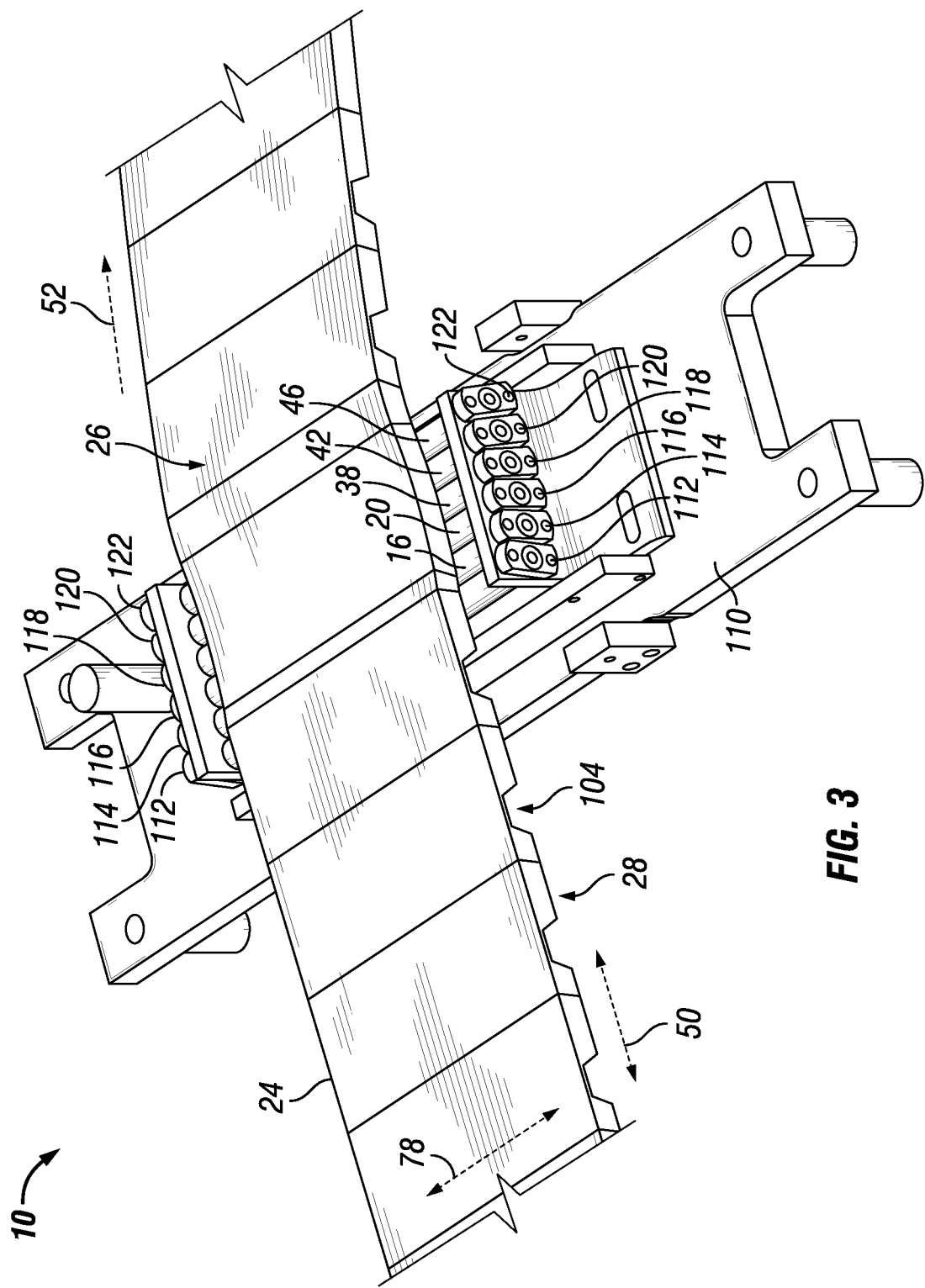
FIG. 3 is a perspective view of a tread support device in accordance with one exemplary embodiment.

The tread support device 10 is shown in FIG. 3 and includes a base 110 that has a series of legs, horizontal platforms, vertical members, and other components. A plurality of support rollers 12, 16, 20, 38, 42, and 46 are rotationally mounted to the base 110 and engage the tread 24 that moves across the tread support device 10 in the machine direction 52. Although not shown, the brush 36 is located above the support rollers 12, 16, 20, 38, 42, and 46 so that the tread 24 is passed between the brush 36 and the support rollers 12, 16, 20, 38, 42, and 46. The support rollers 12, 16, 20, 38, 42, and 46 are rotationally mounted on the base 110 and this rotational mounting may be affected in a variety of manners. As shown, a first bearing set 112 is attached to a pair of vertical members of the base 110 and rotationally mount thereon the first support roller 12. The second support roller 16 is rotationally mounted to the same vertical members of the base 110 by a second bearing set 114, and in a similar manner the third support roller 20 is rotationally mounted to the same vertical members by a third bearing set 116.

The fourth support roller 38 is rotationally mounted to the vertical members of the base 110 by the fourth bearing set 116, and in a similar manner the fifth and sixth support rollers 42 and 46 are rotationally mounted to the vertical members by respective fifth and sixth bearing sets 120 and 122. The support rollers 12, 16, 20, 38, 42, and 46 are constrained by the bearing sets 112, 114, 116, 118, 120, and 122 so that they cannot translate in the longitudinal direction 50, the lateral direction 78 or the vertical direction. The support rollers 12, 16, 20, 38, 42, and 46 are capable of rotating 360 degrees in a direction generally in the longitudinal direction 50 and thus can rotate in the same direction 52 the tread 26 travels when passing through the tread support device 10. The underside surface 26 is the portion of the tread 24 that is treated by the brush 36 and is arranged opposite the support rollers 12, 16, 20, 38, 42, and 46. Although described as being rotationally mounted to vertical members of the base 110 via the bearing sets 112, 114, 116, 118, 120, and 122, it is to be understood that this is but one arrangement of rotationally mounting the support rollers 12, 16, 20, 38, 42, and 46 and that other arrangements are possible in accordance with other exemplary embodiments.

Figure 4:
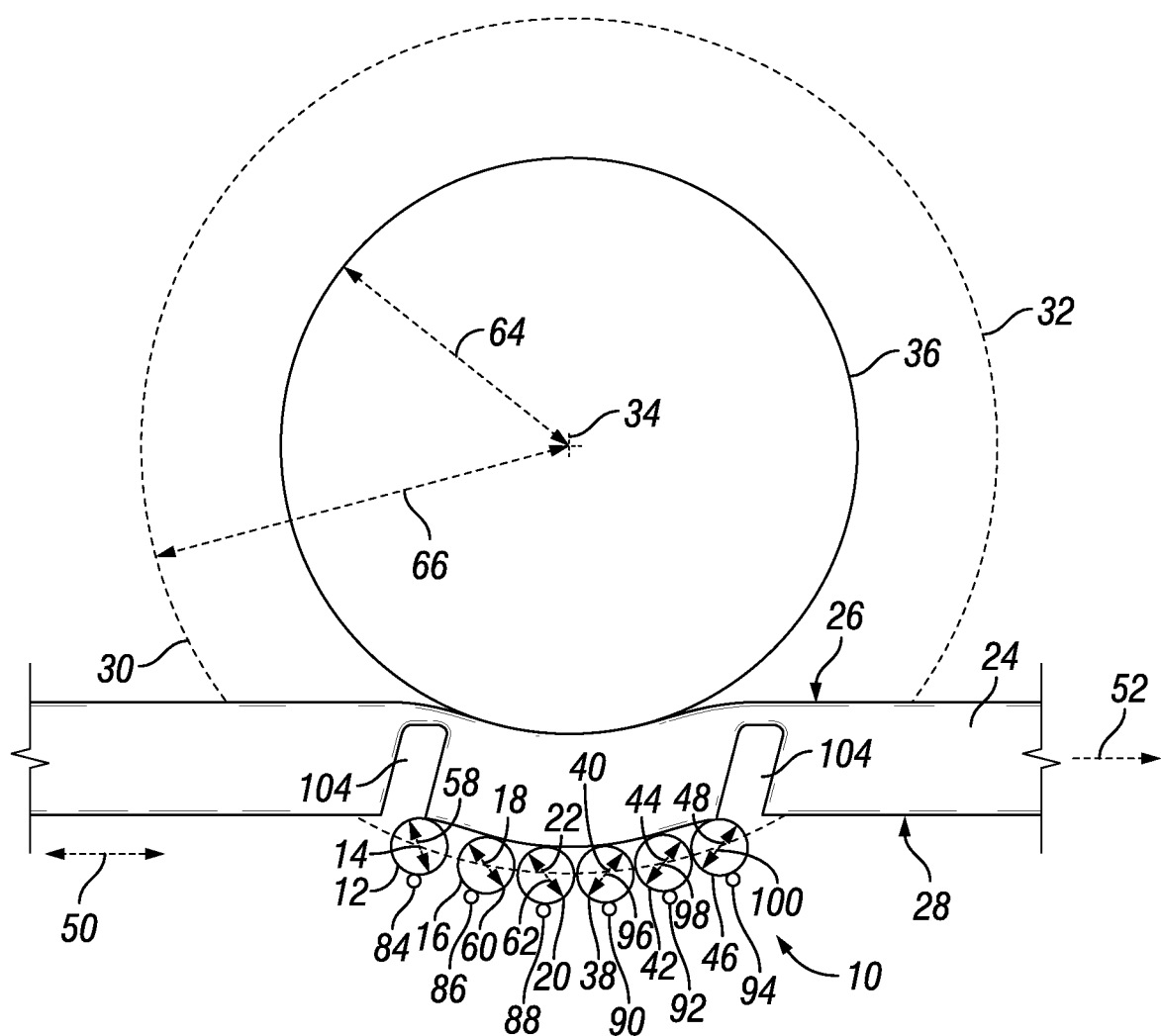
FIG. 4 is a side view of certain portions of the tread support device of FIG. 3.

FIG. 4 is a side view of the tread support device of FIG. 3 with both components removed and components added. The base 110 is removed for clarity and the brush 36 is illustrated. Although shown as a circle, the brush 36 may include a surface that is irregularly shaped as the brush 36 may have bristles that flex or are otherwise not located at the exact same brush radius 64 so as to fall along the exact same outer circle. Representation of the brush 36 as a circle best approximates the brushing location of the brush 36 as related to the tread 24. The first support roller 12 has a first support roller axis 14 about which the first support roller 12 rotates. In a similar fashion, the second support roller 16 rotates about a second support roller axis 18, and the third support roller 20 rotates about its third support roller axis 22. The other support rollers 38, 42 and 46 are arranged in a similar fashion in which the fourth support roller 38 rotates about the fourth support roller axis 40, the fifth support roller 42 rotates about the fifth support roller axis 44, and the sixth support roller 46 rotates about the sixth support roller axis 48. The support roller axes 14, 18, 22, 40, 44 and 48 are all parallel to one another.

The support rollers 12, 16, 20, 38, 42, and 46 are arranged with one another so as to lie along a circle 32 such that they form a support surface that is curved in which the engagement side of the support surface with the tread 24 is concave. The axes 14, 18, 22, 40, 44, and 48 all lie along the circumference 30 of the circle 32 which is the outer boundary of the circle 32. The support rollers 12, 16, 20, 38, 42, and 46 are spaced from one another some amount so that they can rotate freely without interfering with one another. However, in some arrangements they may engage one another so that rotation of one is in fact translated to another. The circle 32 is not a physical component but is used to orient the support rollers 12, 16, 20, 38, 42, and 46 relative to one another in the tread support device 10. The circle 32 has a center 34 that is coaxial with the center of the brush 36, but these two centers need not be coaxial in other embodiments. The circle 32 has a circle radius 66 that extends from the center 34 to the circumference 30 and thus to the axes 14, 18, 22, 40, 44, and 48. The circle radius 66 is the same as the brush radius 64, but it is to be understood that in other exemplary embodiments that they may be different. For example, the circle radius 66 may be larger than the brush radius 64 in other designs of the tread support device 10.

Although shown and described with six support rollers 12, 16, 20, 38, 42, and 46, different numbers can be used in other embodiments. For example, 3, 4, 5, 7, 8, from 9-15, or up to 20 support rollers may be included in other exemplary embodiments. In these instances, the axes of the support rollers may all be included on the circumference 30. In other instances, some of the axes of the support rollers could be located off of the circumference 30.

The brush 34 engages the underside surface 26 as the tread 24 moves through the tread support device 10 in the machine direction 52 and presses against the underside surface 26 to impart the finishing. The tread 24 may be more securely held during the brushing such that the leading and trailing edges 106, 108 of the tread blocks 54 are uniformly treated and so that the tread 24 does not experience undesired movement during brushing. The tread surface 28 may be contoured as it engages and travels over the support rollers 12, 16, 20, 38, 42, and 46 so as to assume the shape of the contact area formed by the support rollers 12, 16, 20, 38, 42, and 46. The shape of the tread surface 28 in this regard may be convex. However, it is to be understood that depending upon the circle radius 66, the number of support rollers, the thickness, geometry and rigidness of the tread 24, the tread surface 28 may assume any type of shape or remain linear thus assuming no deformed shape upon traveling across the support rollers.

Although not present in all embodiments, the tread support device 10 in FIG. 4 has a number of bearing supports 84, 86, 88, 90, 92 and 94 that support the various support rollers 12, 16, 20, 38, 42, and 46. The bearing supports 84, 86, 88, 90, 92 and 94 may be rotationally mounted to the base 110 and can be rollers themselves that engage and roll with the support rollers 12, 16, 20, 38, 42 and 46 on the side opposite that which engages the tread 24. The bearing supports 84, 86, 88, 90, 92 and 94 function to help support the various support rollers 12, 16, 20, 38, 42, and 46 to resist forces imparted by the brush 36 and tread 24 that would otherwise bend or damage the support rollers 12, 16, 20, 38, 42, and 46.

Although described as all being located along the circumference 30, it is to be understood that not all of the axes 14, 18, 22, 40, 44 and 48 need be located on the circumference 30. Three of the axes, for example axes 22, 40 and 44, could be located along the circumference 30, while axes 14, 18 and 48 are located closer to or farther form the center 34. At least three of the axes 14, 18, 22, 40, 44 and 48 are located on the circumference 30 while the rest may be closer to or farther from the center than the three that are on the circumference 30. The engagement profile formed by the support rollers 12, 16, 20, 38, 42 and 46 may be concave in shape.

Figure 5:
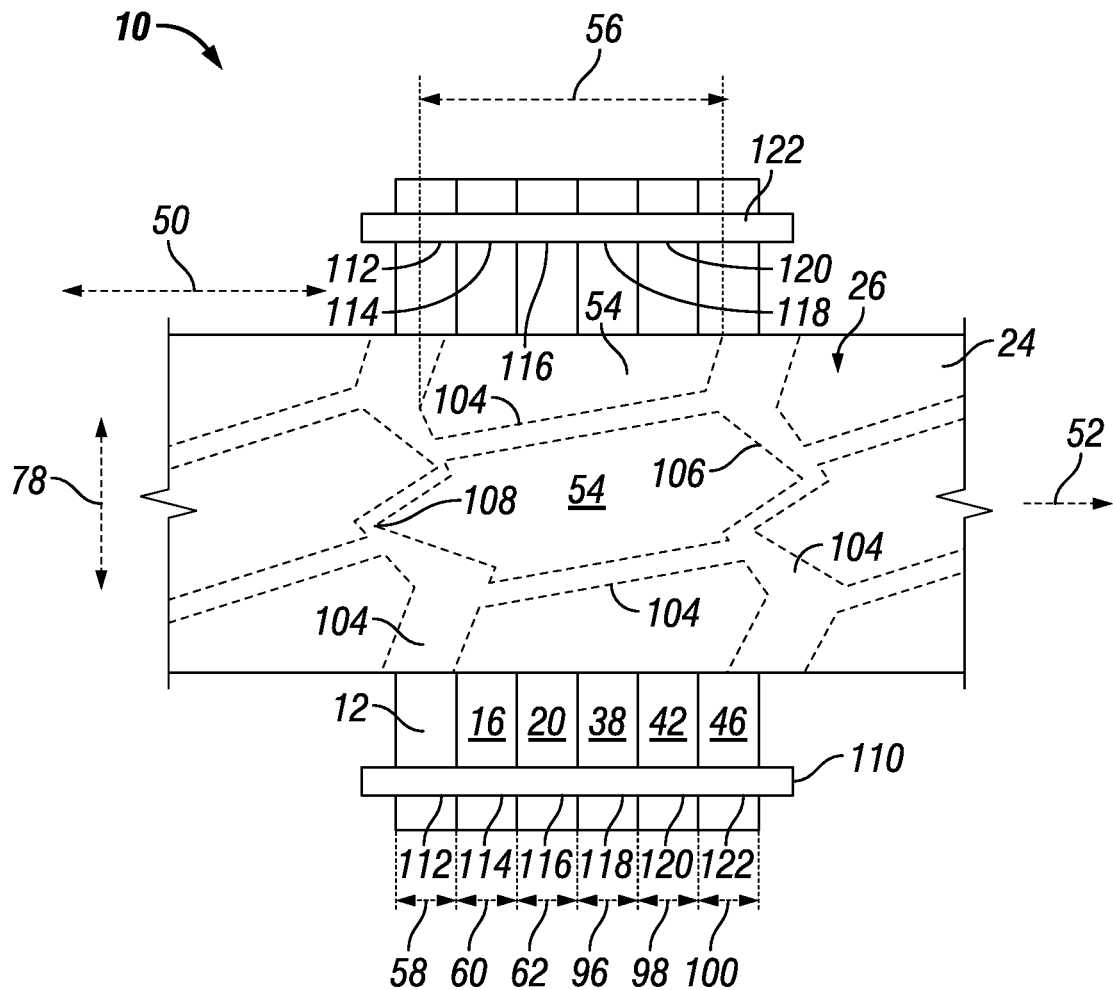
FIG. 5 is a top view of certain portions of the tread support device of FIG. 3.

With reference to FIG. 5, the first support roller 12, second support roller 16, third support roller 20, fourth support roller 38, fifth support roller 42, and sixth support roller 46 are arranged sequentially next to one another in the longitudinal direction 50. The first support roller 12 has a first support roller diameter 58, the second support roller 16 has a second support roller diameter 60, and the third support roller 20 has a third support roller diameter 62. Similarly, the fourth support roller 38 has a fourth support roller diameter 96, the fifth support roller 42 has a fifth support roller diameter 98, and the sixth support roller 46 has a sixth support roller diameter 100. The diameters 58, 60, 62, 96, 98 and 100 may all be the same as one another, or they may be different from one another in various embodiments. The diameters 58, 60, 62, 96, 98 and 100 may be small compared to the diameter of the circle 32. The support rollers 12, 16, 20, 38, 42, and 46 support the tread 24 and engage the tread surface 28. The underside surface 26 is visible and the tread blocks 54 formed by the grooves 104 are shown in hidden lines. The tread blocks 54 have a length 56 that is the length of the tread blocks 54 in the longitudinal direction 50 from the leading edge 106 to the trailing edge 108 of the tread block 54. The lengths 56 of the various tread blocks 54 may be different from one another as the tread blocks 54 have different shapes and configurations. The diameters 58, 60, 62, 96, 98 and 100 of the support rollers 12, 16, 20, 38, 42, and 46 may be smaller than the lengths 56 of all of the tread blocks 54. In certain embodiments, the diameters 58, 60, 62, 96, 98 and 100 are all less than the length 56 of the longest tread block 54 of the tread 24. In some embodiments, the first support roller diameter 58 is less than ¼ of the length 56 of the longest tread block 54 of the tread 24. In yet other exemplary embodiments, the second support roller diameter 60, third support roller diameter 62, fourth support roller diameter 96, fifth support roller diameter 98, and sixth support roller diameter 100 are each less than ¼ the length 56 of the longest tread block 54 of the tread 24 being brushed.

Figure 6:
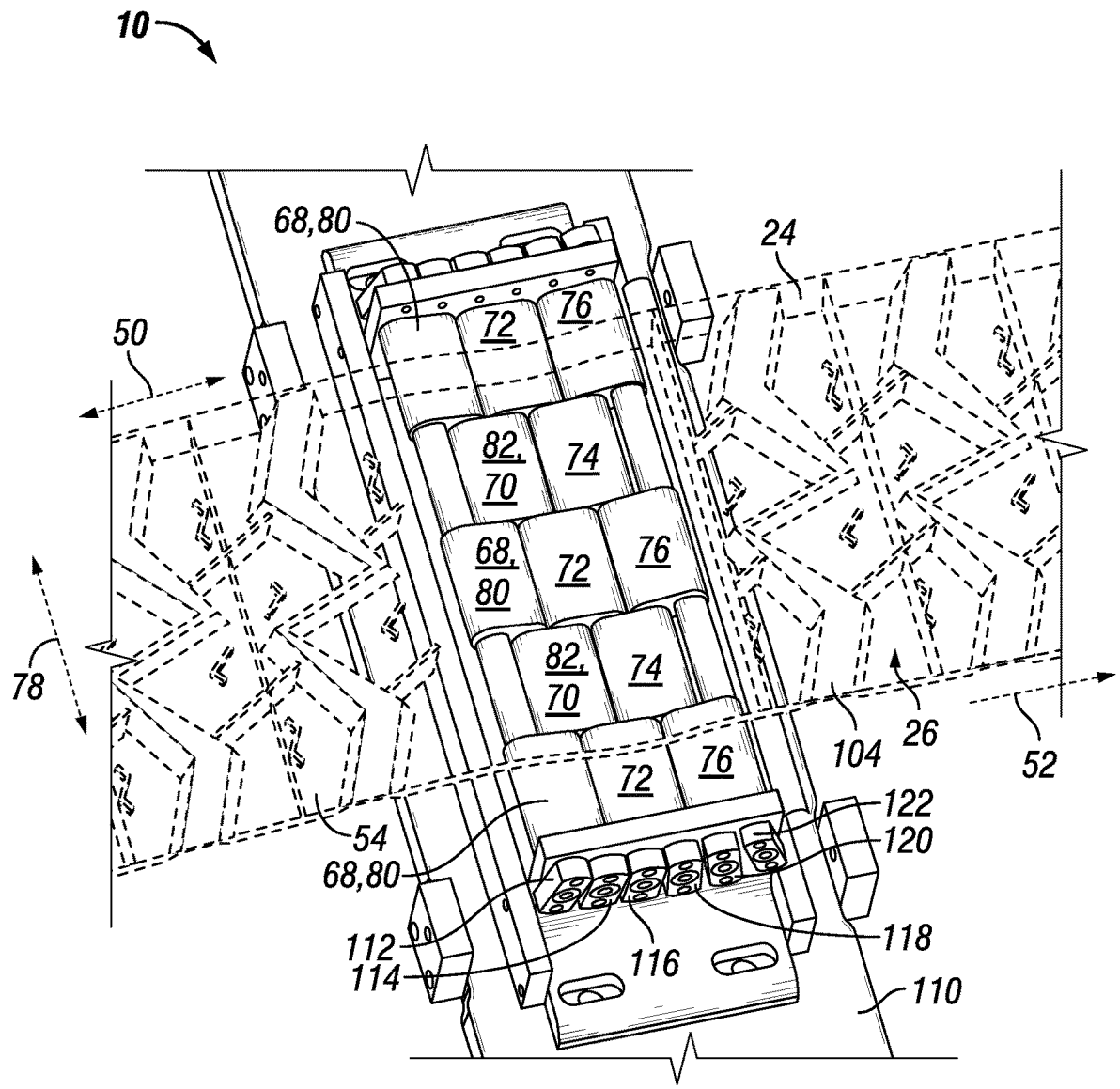
FIG. 6 is a perspective view of the tread support device in accordance with another exemplary embodiment.

In other arrangements of the tread support device 10, belts can be attached to one or more of the support rollers to form some or all of the surface that engages the tread surface 28. FIG. 6 is a perspective view of an alternate exemplary embodiment in which the tread support device 10 is arranged in the same manner as previously discussed except with the addition of a plurality of belts 68, 70, 72, 74 and 76 onto the support rollers 12, 16, 20, 38, 42, and 46. The belts 68, 70, 72, 74 and 76 are connected to adjacent ones of the support rollers 12, 16, 20, 38, 42, and 46 and may function to restrict the tread blocks 54 from getting in between the adjacent support rollers 12, 16, 20, 38, 42, and 46 to further restrict irregular movement of the tread blocks 54 during processing to produce improved brushing and finishing quality.

Figure 7:
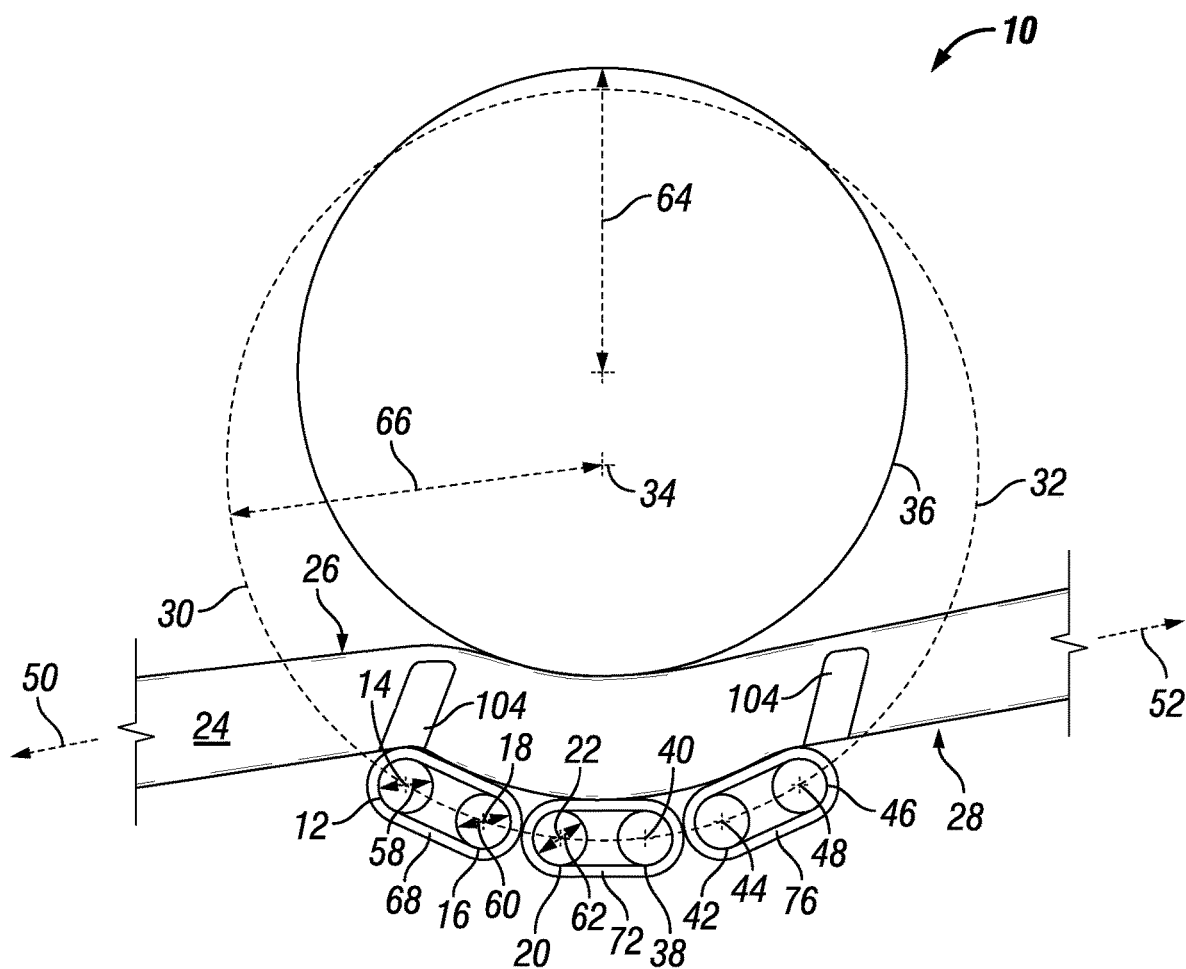
FIG. 7 is a side view of certain portions of the tread support device of FIG. 6.

FIG. 7 is a side view of portions of the tread support device 10 shown in FIG. 6. The brush 36 is not as large as the circle 32, and the circle radius 66 is greater than the brush radius 64. Also, the center 34 of the circle 32 is closer to the tread 24 and the support rollers 12, 16, 20, 38, 42, and 46 than the center of the brush 36 is to the tread 24 and the support rollers 12, 16, 20, 38, 42, and 46. In general, the closer the brush radius 64 is to the circle radius 66, the more restriction will be applied to the irregular tread 24 movement, but this will increase the contact patch and increase the brushing force. The larger the circle radius 66 is in relation to the brush radius 64, the smaller the contact patch will be on the tread 24 and the less brushing force will be applied to the underside surface 26. As such, selection of the appropriate brush radius 64 and circle radius 66 for the tread support device 10 may take into account several factors such as tread 24 rigidity, tread block 54 characteristics, and brushing power.

The support roller axes 14, 18, 22, 40, 44 and 48 are all located on the circumference 30 of the circle 32 and are all in sequential fashion next to one another. The distance between the sequential support rollers 12, 16, 20, 38, 42, and 46 may be larger so that they are spaced a greater arc length from one another in the FIG. 7 embodiment than in the earlier FIG. 4 embodiment. The various belts 68, 70, 72, 74 and 76 may be located between the rollers 12, 16, 20, 38, 42, and 46 and may contact one another or be spaced from one another. As shown, the first belt 68 surrounds the first support roller 12 and the adjacent second support roller 16. The third belt 72 surrounds the third support roller 20 and the adjacent fourth support roller 38. The fifth belt 76 surrounds the adjacent fifth and sixth support rollers 42 and 46. The tread surface 28 engages the belts and the belts further constrain the tread block 54 movement to achieve less irregular movement during brushing and help improve the finishing quality. Portions of the belts 68, 70, 72, 74 and 76 may be located along the circumference 32.

Figure 8:
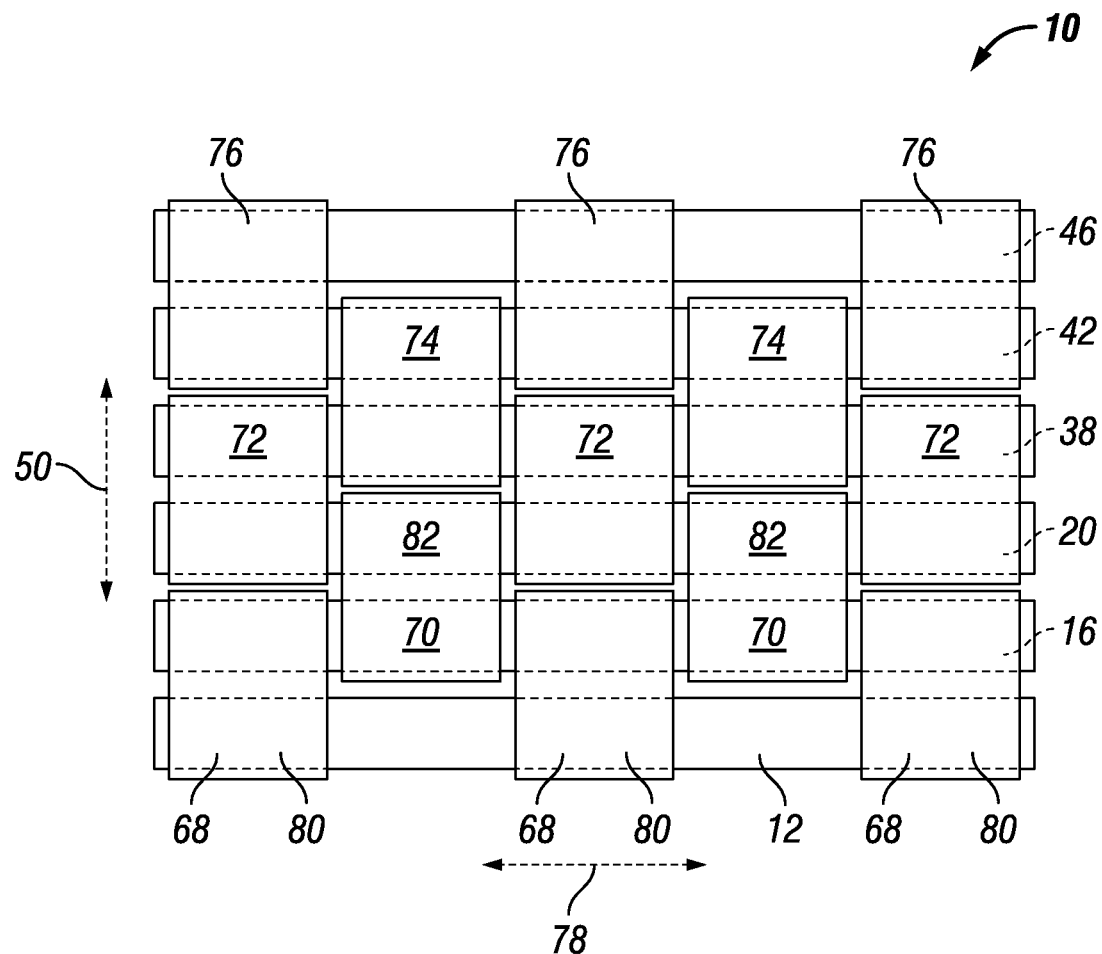
FIG. 8 is a top view of certain portions of the tread support device of FIG. 6.

FIG. 8 is a top view of portions of the tread support device 10 of FIGS. 6 and 7. The brush 36 and the tread 24 are removed for clarity to reveal the support surface onto which the tread 24 will rest when being brushed. The first belt 68 is only attached to the first and second support rollers 12, 16 and is broken up along the lengths of the rollers 12, 16 in the lateral direction 78 into three sections 80. Each one of the sections 80 is of the same length in the lateral direction 78 and spaced evenly from one another in the lateral direction 78. The first support roller 12 is uncovered by the first belt 68 at two sections located between the three sections 80, and the tread surface 28 may directly engage the first support roller 12 at these locations. In other arrangements, the tread surface 28 does not engage the exposed sections of the first support roller 12 and is at all times suspended above these sections by the belts 68, 70, 72, 74, and 76.

The second belt 70 is made of a pair of sections 82 that are spaced from one another in the lateral direction 78. The sections 82 each have the same length as one another in the lateral direction 78 and are offset from the ends of the support rollers 16 and 20 so that they are not located at the outer edges of the engagement surface of the tread surface 28. The second belt 70 surrounds the second support roller 16 and the adjacent third support roller 20. The entire second support roller 16 may be covered by the first and second belts 68, 70 so that it does not directly engage the tread 24 when the tread 24 is being brushed.

The third belt 72 may likewise be provided in a number of sections that are spaced from one another in the lateral direction 78 and are located at the edges of the engagement surface of the tread 24. The third belt 72 surrounds the third support roller 20 and the fourth support roller 38, and the third support roller 20 is isolated from direct contact with the tread 24 by the second and third belts 70 and 72. The fourth belt 74 is spaced between the third belt 72 in the lateral direction 78 and is made of two pieces. The fourth belt 74 is attached to the fourth support roller 38 and the fifth support roller 42 and is spaced from the edges of the engagement surface of the tread 24 in the lateral direction 78. The fourth belt 74 is made of a pair of pieces that have the same width as one another in the lateral direction 78. The fifth belt 76 is made of three pieces spaced from one another in the lateral direction 78 and having the same width. The fifth belt 76 is attached to the fifth support roller 42 and the sixth support roller 46 and forms a portion of the outer edges of the engagement surface with the tread 24. Portions of the sixth support roller 46 are uncovered by the fifth belt 76 and are exposed in the same way as the first support roller 12 to directly face the tread surface 28. The tread 24 may or may not directly engage the sixth support roller 46 when the tread 24 is brushed.

The second, third, fourth, and fifth support rollers 16, 20, 38 and 42 are all surrounded by the belts 68, 70, 72, 74 and 76 so that their surfaces do not directly face the tread surface 28 and so that the tread 24 does not directly engage the support rollers 16, 20, 38 and 42. Although the belts 68, 70, 72, 74 and 76 are all made of multiple pieces spaced in the lateral direction 78, they may include only a single piece in the lateral direction in some embodiments. Further, although shown as being made of two or three pieces, the belts 68, 70, 72, 74 and 76 may be made of any number of pieces in accordance with various exemplary embodiments.

The belts 68, 70, 72, 74 and 76 connect adjacent support rollers 12, 16, 20, 38, 42 and 46 and may be made of material that is elastic to a certain degree. The belts 68, 70, 72, 74 and 76 can be stretched and then mounted onto the support rollers 12, 16, 20, 38, 42 and 46 with some degree of preset tension so that an additional tension device for the belts 68, 70, 72, 74 and 76 is not needed. In accordance with other exemplary embodiments, preset tensioning devices may be used to apply tension to the belts 68, 70, 72, 74 and 76 in addition to or alternatively from the inherent elasticity. The belts 68, 70, 72, 74 and 76 may all rotate in the longitudinal direction 50 as the tread 24 is pulled/pushed across the tread support device 10. Further, although not shown, bearing supports could be included if desired under the support rollers 12, 16, 20, 38, 42 and 46 and could engage the belts 68, 70, 72, 74 and 76 to provide support.

Figure 9:
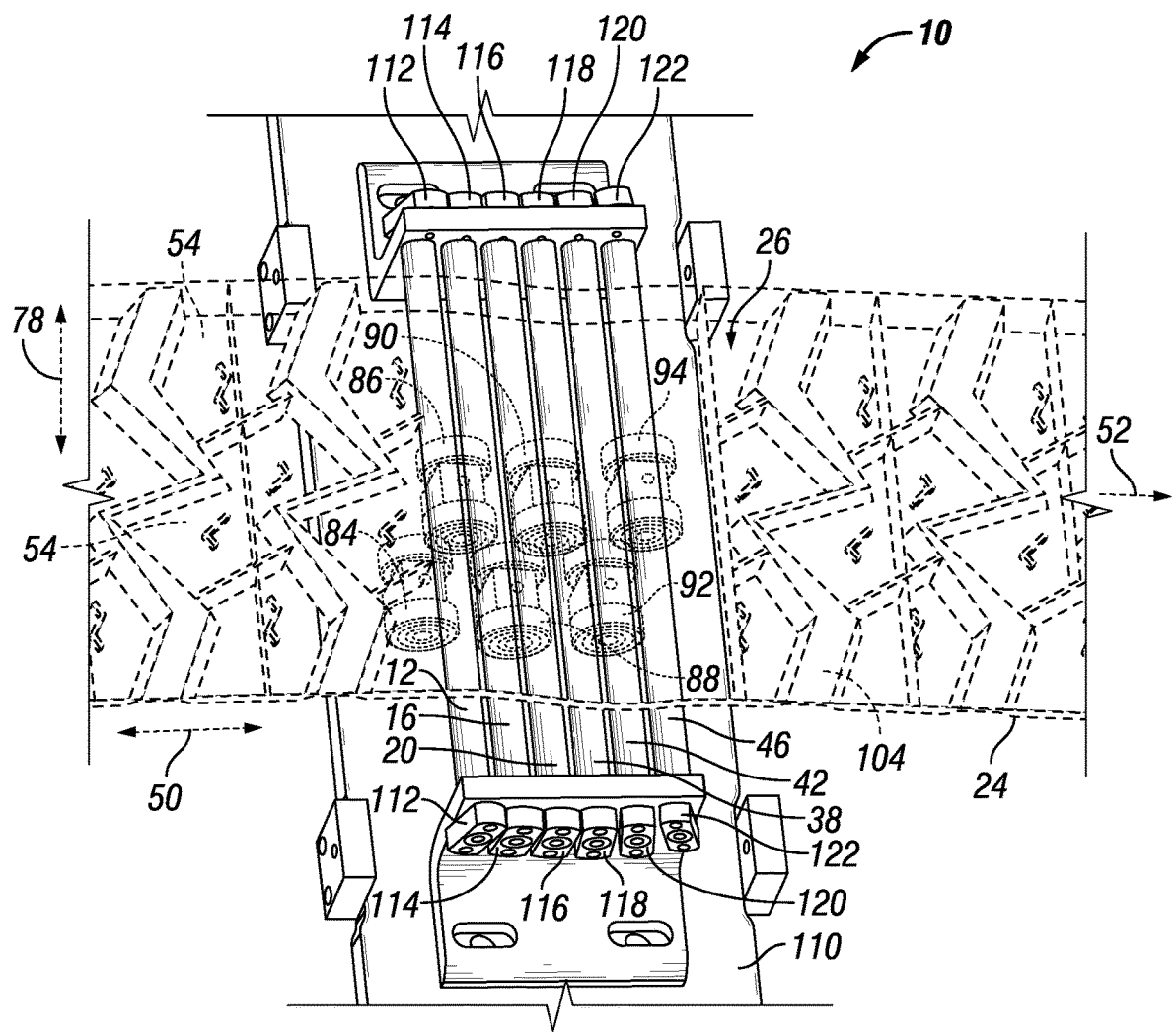
FIG. 9 is a perspective view of the tread support device in accordance with another exemplary embodiment.

Forces imparted onto the support rollers 12, 16, 20, 38, 42 and 46 by the brush 36 during the brushing operation may function to bend the support rollers 12, 16, 20, 38, 42 and 46. Support rollers 12, 16, 20, 38, 42 and 46 that have small diameters 58, 60, 62, 96, 98 and 100 and/or are long in the lateral direction 78, their lengths between the vertical supports of the base 110, may be more susceptible to being bent or otherwise deformed by forces applied by the brush 36. If the support rollers 12, 16, 20, 38, 42 and 46 become deformed it may result in uneven brushing of the underside surface 26 such that uneven finishing may occur in the middle and side of the tread 26. In order to help brace the support rollers 12, 16, 20, 38, 42 and 46 so that they can resist bending or deformation forces brought on by the brush 36, a series of bearing supports 84, 86, 88, 90, 92 and 94 can be provided as shown in FIG. 9. The bearing supports 84, 86, 88, 90, 92 and 94 are mounted to the base 110 and are located between the base and the support rollers 12, 16, 20, 38, 42 and 46 in the vertical direction of the tread support device 10. FIG. 9 shows a portion of the tread 24 as well as the support rollers 12, 16, 20, 38, 42 and 46 being transparent so that detail of the bearing supports 84, 86, 88, 90, 92 and 94 may be observed. The bearing supports 84, 86, 88, 90, 92 and 94 may be arranged in a variety of manners, and as shown include a stand from which a pair of wheels are rotationally mounted and extend from either side. In other embodiments, only a single wheel may be present with the bearing supports 84, 86, 88, 90, 92 and 94. In other arrangements, the bearing supports 84, 86, 88, 90, 92 and 94 may be a belt, sphere, arced surface, or any other type of mechanism or structure capable of supporting the various support rollers 12, 16, 20, 38, 42 and 46.

Figure 10:
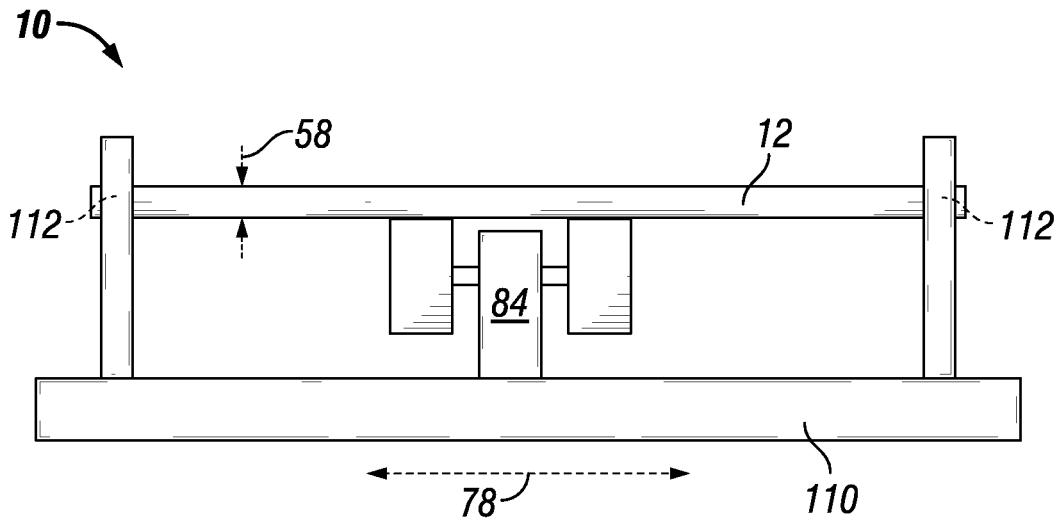
FIG. 10 is a front view of certain portions of the tread support device of FIG. 9.

FIG. 10 is a front view of certain portions of the tread support device 10 shown in FIG. 9. The first bearing support 84 has a stand that extends upwards from the base 110 in the vertical direction, and a pair of wheels extend from either side of the stand in the lateral direction 78. The wheels are rotationally mounted to the stand such that they rotate relative to the stand. The wheels engage the first support roller 12 at two different locations along its length in the lateral direction 78. One of these engagement points may be the center of the first support roller 12 in the lateral direction 78 and thus at the midpoint between the first set of bearings 112 that hold the first support roller 12 on either end. The other engagement point may be off center in the lateral direction 78. In other arrangements, neither of the engagement points of the wheels of the first bearing support 84 are located at the midpoint of the first support roller 12 in the lateral direction 78.

Forces from the brush 36 are transferred into the tread 24 during brushing of the tread 24, and in turn these forces move into the first support roller 12 and then into the vertical mounts of the base 110 with the first support roller 12. With the presence of the first bearing support 84, these forces are also transferred into the wheels of the first bearing support 84 and then through the attached stand and into the base 110. The wheels are not driven wheels but instead. Motion from the tread 24 causes the first support roller 12 to rotate about its first support roller axis 14. In turn this motion is imparted onto the engaged wheels of the first bearing support 84 and they rotate relative to the stand to which they are rotationally mounted. The engagement between the wheels and the first support roller 12 may be point or line contact sufficient to transfer forces into the wheels, but is light enough to still allow the first support roller 12 to rotate. The engagement with the first bearing support 84 provides additional support to the first support roller 12 to help prevent it from deforming or bending under the brushing forces to allow it to maintain a consistent brushing force on the tread 24 with the elimination of irregular brushing patches.

Figure 11:
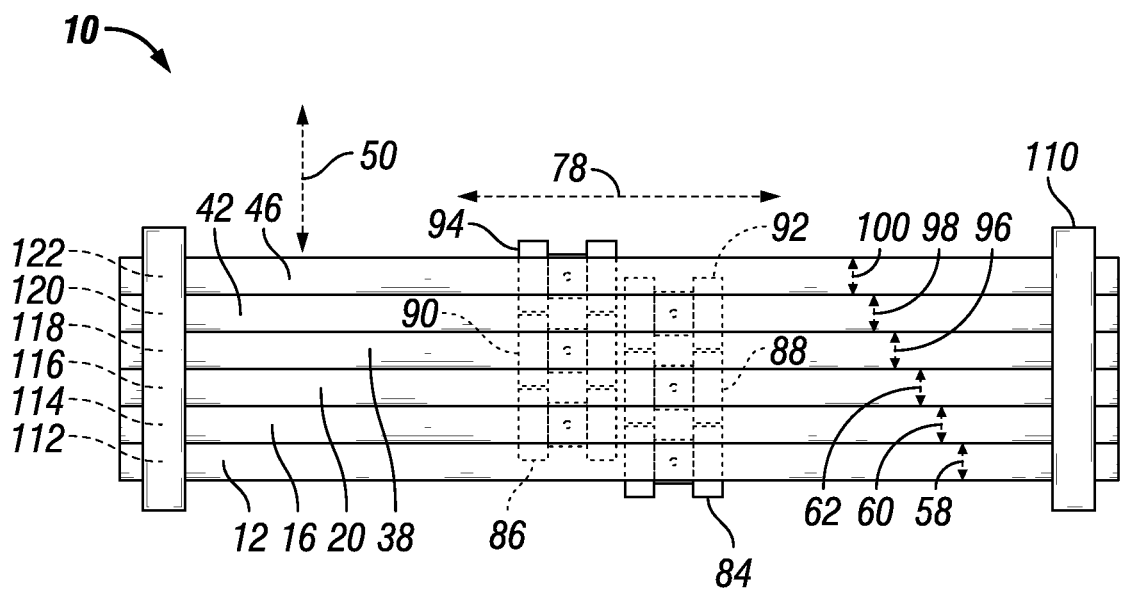
FIG. 11 is a top view of certain portions of the tread support device of FIG. 9.

FIG. 11 is a top view of certain portions of the tread support device 10 shown in FIGS. 9 and 10. The first bearing support 84 supports the first support roller 12, the second bearing support 86 supports the second support roller 16, and the third bearing support 88 supports the third support roller 20. In a similar manner, the fourth bearing support 90, fifth bearing support 92, and sixth bearing support 94 support the fourth support roller 38, fifth support roller 42, and sixth support roller 46 respectively. The second through sixth bearing supports 86, 88, 90, 92 and 94 may be arranged in the same manner as previously discussed with respect to the first bearing support 84, and a repeat of this information is not necessary. The first, third and fifth bearing supports 84, 88 and 92 are aligned with one another in the longitudinal direction 50 in that they are spaced the same distance in the lateral direction 78. The second, fourth and sixth bearing supports 86, 90 and 94 likewise aligned with one another in the longitudinal direction 50 as they are located at the same distance as one another in the lateral direction 78. It is therefore the case that the set of first, third and fifth bearing supports 84, 88 and 92 are offset from the set of second, fourth and sixth bearing supports 86, 90 and 94 in the lateral direction 78. The reason for this offset is simply because of the size and spacing constraints of the support rollers 12, 16, 20, 38, 42 and 46 relative to the bearing supports 84, 86, 88, 90, 92 and 94. If the bearing supports 84, 86, 88, 90, 92 and 94 are small enough, they may all be arranged in a line in the longitudinal direction 50 and may be at the same location in the lateral direction 78. When offset, however, some or none of the bearing supports 84, 86, 88, 90, 92 and 94 may be located at the midpoint of the support rollers 12, 16, 20, 38, 42 and 46 in the lateral direction 78. However, all of the bearing supports 84, 86, 88, 90, 92 and 94 may be either at or proximate to the midpoint so that the support rollers 12, 16, 20, 38, 42 and 46 are supported at or proximate to their midpoints.

The bearing supports 84, 86, 88, 90, 92 and 94 may be permanently attached to the base 110, or may be movable relative to the base 110 so that they may be moved to desired portions of the support rollers 12, 16, 20, 38, 42 and 46. The sections of support may be selected as desired in order to provide different areas of support for different brushing applications. The bearing supports 84, 86, 88, 90, 92 and 94 may be movable in the lateral direction 78 relative to the base 110. Although shown as having only a single bearing support 84, 86, 88, 90, 92 and 94 associated with each support roller 12, 16, 20, 38, 42 and 46, any number of them may be used in connection with each support roller 12, 16, 20, 38, 42 and 46 in accordance with various exemplary embodiments.

The tread support device 10 may function by restricting the space while the tread block 54 passes through the brushing area. The first and last support rollers 12, 46 in the longitudinal direction 50 may be arranged higher than any of the other support rollers in the vertical direction of the tread support device 10 which is the direction between the center of the bank of support rollers and the center of the brush 36. The support rollers 12, 16, 20, 38, 42 and 46 should be close enough to one another, and the support roller diameters 58, 60, 62, 96, 98 and 100 should be small enough to form a "pinch point" with the tread blocks 54. The tread support device 10 may be arranged so as to constrain unwanted movement or deformation under the combination of brushing force, feeding force and rubber internal stresses.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A tread support device for a retread process, comprising:
    a first support roller, wherein the first support roller rotates about a first support roller axis;
    a second support roller, wherein the second support roller rotates about a second support roller axis;
    a third support roller, wherein the third support roller rotates about a third support roller axis; and
    wherein the first support roller, the second support roller, and the third support roller support a tread;
    wherein the first support roller axis, the second support roller axis, and the third support roller axis are arranged with respect to one another so as to be located on a circumference of a circle;
    wherein the second support roller is between the first support roller and the third support roller in a longitudinal direction, and further comprising:
    a first belt that surrounds the first support roller and the second support roller, wherein the first belt does not surround the third support roller, wherein the tread engages the first belt; and
    a second belt that surrounds the second support roller and the third support roller, wherein the second belt does not surround the first support roller, wherein the tread engages the second belt.

2. The tread support device as set forth in claim 1, wherein the first belt is made of an elastic material and is stretched between the first support roller and the second support roller so as to be tensioned, and wherein the second belt is made of an elastic material and is stretched between the second support roller and the third support roller so as to be tensioned.

3. The tread support device as set forth in claim 1, further comprising:
    a fourth support roller, wherein the fourth support roller rotates about a fourth support roller axis, wherein the third support roller is between the second support roller and the fourth support roller in the longitudinal direction;
    a fifth support roller, wherein the fifth support roller rotates about a fifth support roller axis, wherein the fourth support roller is between the third support roller and the fifth support roller in the longitudinal direction;
    a sixth support roller, wherein the sixth support roller rotates about a sixth support roller axis, wherein the fifth support roller is between the fourth support roller and the sixth support roller in the longitudinal direction;
    wherein the fourth support roller, the fifth support roller, and the sixth support roller support the tread;
    wherein the fourth support roller axis, the fifth support roller axis, and the sixth support roller axis are arranged with respect to one another so as to be located on the circumference of the circle,
    a third belt that surrounds the third support roller and the fourth support roller, wherein the third belt does not surround the first support roller, the second support roller, the fifth support roller or the sixth support roller, wherein the tread engages the third belt;
    a fourth belt that surrounds the fourth support roller and the fifth support roller, wherein the fourth belt does not surround the first support roller, the second support roller, the third support roller or the sixth support roller, wherein the tread engages the fourth belt; and
    a fifth support belt that surrounds the fifth support roller and the sixth support roller, wherein the fifth support belt does not surround the first support roller, the second support roller, the third support roller or the fourth support roller, wherein the tread engages the fifth belt;
    wherein the first support belt does not surround the fourth support roller, the fifth support roller or the sixth support roller;
    wherein the second support belt does not surround the fourth support roller, the fifth support roller or the sixth support roller.

4. The tread support device as set forth in claim 1, wherein the first support belt is made of a plurality of sections that are spaced from one another in a lateral direction of the tread, wherein a portion of the first support roller is not surrounded by the first support belt, and wherein the second support belt is made of a plurality of sections that are spaced from one another in the lateral direction of the tread, and wherein all of the sections of the first support belt are offset from all of the sections of the second support belt in the lateral direction of the tread.

* * * * *